(12) United States Patent
Chaffee et al.

(10) Patent No.: US 11,621,787 B2
(45) Date of Patent: Apr. 4, 2023

(54) REMOTELY PUMPED FREE-SPACE OPTICAL (FSO) COMMUNICATION TERMINALS

(71) Applicant: Attochron, LLC, Lexington, VA (US)

(72) Inventors: Thomas Malcolm Chaffee, Lexington, VA (US); Paul F. Szajowski, Chatham Borough, NJ (US)

(73) Assignee: Attochron, LLC, Lexington, VA (US)

( * ) Notice: Subject to any disclaimer, the term of this patent is extended or adjusted under 35 U.S.C. 154(b) by 0 days.

(21) Appl. No.: 17/682,009

(22) Filed: Feb. 28, 2022

(65) Prior Publication Data

US 2022/0416909 A1 Dec. 29, 2022

Related U.S. Application Data

(63) Continuation of application No. 15/923,900, filed on Mar. 16, 2018, now Pat. No. 11,265,088.

(60) Provisional application No. 62/472,423, filed on Mar. 16, 2017.

(51) Int. Cl.
| | | |
|---|---|---|
| *H04B 10/00* | (2013.01) | |
| *H04B 10/80* | (2013.01) | |
| *H04B 10/11* | (2013.01) | |
| *H04B 10/118* | (2013.01) | |
| *H04J 14/00* | (2006.01) | |
| *H04B 10/50* | (2013.01) | |
| *H04B 10/40* | (2013.01) | |

(52) U.S. Cl.
CPC ........... *H04B 10/807* (2013.01); *H04B 10/11* (2013.01); *H04B 10/118* (2013.01); *H04B 10/40* (2013.01); *H04B 10/503* (2013.01)

(58) Field of Classification Search
CPC ... H04B 10/11; H04B 10/112; H04B 10/1121; H04B 10/114; H04B 10/1141; H04B 10/118; H04B 10/806; H04B 10/807
See application file for complete search history.

(56) References Cited

U.S. PATENT DOCUMENTS

| | | | |
|---|---|---|---|
| 2007/0053696 A1* | 3/2007 | Bloom | H04B 10/112 398/141 |
| 2019/0207679 A1* | 7/2019 | Andrekson | H04B 10/112 |

* cited by examiner

*Primary Examiner* — Daniel G Dobson
(74) *Attorney, Agent, or Firm* — Scale LLP

(57) ABSTRACT

This invention pertains to the field of free-space optical (FSO) communications, and specifically to the realization of functional FSO optical transceiver terminals located at remote electrically unpowered locations within a communications network. A remote unpowered FSO terminal located at a far-end location receives necessary optical power from a powered base station location (near-end) required for all optical amplification functions necessary for NRZ or RZ format signals within the spectral range of 900 nm to 1480 nm as well as an Ultra Short Pulsed Laser (USPL) centered at 1560 nm at the far-end location. A transmitting node identified as the near-end transmits an optical signal identified as a pump signal to a remote location classified as the far-end node over a free space medium, such as the atmosphere, where the far-end node location does not have available electrical power for operation of electro-optic components required for transmission and retransmission functions.

1 Claim, 4 Drawing Sheets

REMOTELY PUMPED FREE-SPACE OPTICAL (FSO) COMMUNICATION TERMINALS

CROSS REFERENCES TO RELATED APPLICATIONS

This application is a continuation of U.S. patent application Ser. No. 15/923,900, filed Mar. 16, 2018, which claims the benefit of U.S. Provisional Patent Application Ser. No. 62/472,423 filed on Mar. 16, 2017, titled REMOTELY PUMPED FREE-SPACE OPTICAL (FSO) COMMUNICATION TERMINALS and U.S. Non-Provisional patent application Ser. No. 15/842,619 filed on Dec. 14, 2017, titled WAVELENGTH DIVISION MULTIPLEXING PER PULSE FROM ULTRA SHORT PULSED LASERS USED IN FREE SPACE AND FIBER OPTICAL COMMUNICATION SYSTEMS and to U.S. Non-Provisional patent application Ser. No. 15/582,693 filed on Apr. 30, 2017, titled USPL-FSO LASERCOM POINT-TO-POINT AND POINT-TO-MULTIPOINT OPTICAL WIRELESS COMMUNICATIONS and to U.S. Provisional Patent Application Ser. No. 62/627,563 filed on Feb. 7, 2018, titled METHOD AND APPARATUS FOR ULTRA-SHORT PULSED LASER COMMUNICATION THROUGH A LOSSY MEDIUM, the contents which are all hereby incorporated by reference herein.

TECHNICAL FIELD AND INDUSTRIAL APPLICABILITY OF THE INVENTION

Background of the Invention

1. Field of the Invention

This invention relates to free-space optical (FSO) laser communications networks, including
ultra-short pulse laser (USPL) communications, and in particular, but not exclusively, to optical regeneration and retransmission of communications signals received at remote communications transceiver sites that do not have available sources of electrical power. Rather, such transceiver sites are energized by the transmission of optical power to them from another transceiver site in the network that does have an electrical power source. Novel use of optical pumping amplification of received data is described without the need for electrical power at such transceiver sites that lack electrical power. Such FSO communication networks shall operate uni-directionally or bi-directionally within any spectral band.

2. Description of Related Art

Terrestrial and submarine optical communication networks have dominated the telecommunications industry in supplying high capacity information highways for private and commercial needs. In such designs, optical data signals are transported and guided within optical transmission fiber as a propagating medium.

As optical signals are transported within an optical fiber, each data stream experiences a logarithmic decrease in optical power level as a function of distance.

To compensate for optical transmission loss, attenuation, through fiber, optical amplification techniques are installed into repeater housings at predetermined positions within a network. Such repeaters house necessary electro-optical and network management functions required for amplification functions, along with provisions for electrical power.

Accordingly, these functions within a repeater require electrical power, and limit the reach, cost and overall versatility of network deployment, especially in certain urban and rural regions.

Growth in demand for telecommunication services, from both the private as well as commercial sectors has placed an unprecedented strain upon current telecommunications networks. Without alternate network system technologies and delivery topologies, overall effective network speed will be reduced and frequent bottlenecks within networks will become more commonplace in the very near future.

Free-space optical communications networks provide a natural alternative to fiber based, microwave links, wire, or cable system applications, where feasible. These networks are transparent to current as well as future network architectures in that they share common technological platforms with fiber optic transmission systems, the backbone of the present day telecommunication systems[1].

Free-space optical (FSO) communication networks share common fiber-optic components to terrestrial and submarine systems, in that identical O-, C- and L-band lasers, and receivers can be utilized for both applications. The only exception for FSO data link systems is that the medium of propagation is the atmosphere.

Utilizing current state-of-the art USPLs and other fiber-optic lasers and components, FSO data links can be fully integrated into current short- and long-haul high-speed optical networks. Utilizing current 1550 nm technology platforms FSO data links can fully attain current system architectures, additionally the systems can be completely scaled to higher data rates and configurations.

Additionally, because of the operating wavelength of the system, issues related to eye safety are minimized. Furthermore, no special precautions or permits need to be issued for operating a free-space data link related to territorial right-of-ways, expenses related to plowing and trenching of fixed cabled system can be waved as well.

Current laser communications terminals or FSO laser communications terminals require electrical power to achieve electro-optic regeneration of received signals to operate as effective network elements.

Incoming optical signals received at remote transceiver locations, require optical-electrical-optical conversion processes to occur in operation of FSO links. As such an external power source, typically electrical is required to implement this technique. Thus in certain environments where external power sources are not available, this approach is not feasible for utilization of an FSO type data-link.

Optical FSO transceivers having electrically powered provisions have various limiting issues, wherein the cost and complexity is a major factor. Another drawback to currently used FSO transceivers is in the data-rate specific designs where operation is typically limited to a specific operating line rate. Operationally, such systems require extraordinary manufacturing hardware and assembly complexity.

However presently used or considered approaches rely upon direct current, batteries, solar cell power technologies as well as other considerations. As such, these alternatives are complex, costly, require maintenance of batteries, pose a health and fire risk along with potential reliability of operation, and added costs in production and assembly.

There is thus a need in the art for an effective way to implement a passive technique to realize remote optical amplification, regeneration and retransmission capabilities while reducing complexity and maintaining network reliability for FSO transport traffic.

SUMMARY OF THE INVENTION

In this disclosure, an optical pump source in a transceiver located at a base-station (near-end) location is transmitted over the air to an unpowered remote (far-end) transceiver location. At the far-end transceiver, received pump power is used to amplify data-signals present at the far-end location. Commonly used procedures, components and practices used in optical amplification technology are employed. In practice, optical pump signals transmitted from a near-end transceiver location via free-space are received at a far-end transceiver location.

The pump signal received at a remote transceiver location provides necessary optical pump power for use in the optical amplification process and used to amplify low-level signals present at the far-end transceiver location for propagation back to the near-end location or other nodes present within the network. In this manner, bi-directional links are established, without the need or requirement for electrical power at remote (far-end) locations.

In a similar manner, available pump power at a far-end location can extend optical transport to directions other than direct lines of sight. Since FSO technology is directed along a single line-of-sight-path, secondary or intermediate base-stations can be remotely powered appropriately as required for links covering such non-linear paths. In such situations an intermediate base-station located at an optimum position allow for redirection to the far-end, non-line-of-sight positions.

Functionally a FSO data link consists of a telescope for transmitting from a near-end node an optical signal toward a second telescope located at a far-end. In principal, the far-end receive telescope collects incoming signals from the near-end, where data transmitted can be within the optical O-, C, and L-bands or other bands. Incoming light collected at the far-end transceiver, detected by appropriate photo-detector hardware required for data recovery and retransmitted onto the network. FSO transceivers operate bi-directionality, sending information simultaneously within the network.

At the far-end site, available local pump power can re-amplify incoming data signals with erbium-doped and or erbium/ytterbium doped fiber segments. In this capacity, an amplified signal is couple to another transmitting terminal element for transmission to another network node location.

Modern day fiber based optical communication networks utilize all optical repeaters to amplify data streams transported within glass fibers after signals have experienced attenuation in optical power levels. Such repeaters amplify attenuated signals after span propagation through the glass medium to a level to offset optical span losses. To realize optical amplification local electrical power is required to operate necessary optical pump lasers present within each amplifier stage. Such amplifiers are fiber based and incorporate transition elements such as erbium (Er-63) and or ytterbium (Yb-70) to produce a medium capable of amplification within the 1520 to 1650 nm optical transmission windows. Although mentioned, the disclosure is not limited to optical amplification elements of erbium and ytterbium, but may also include other chemical constituents such as praseodymium (Pr-59) and others in like within the Lanthanide and Actinides series of elements used for optical amplification within the optical window about 1300 nm.

To produce an amplifying glass medium, pump lasers are used in conjunction with the amplifying glass medium to optically invert the medium in the presence of incoming attenuated data signals, thereby achieving optical amplification. Typically, pump lasers used in optical amplifiers operate at 980, 1450 and 1480 nm, and are directly coupled into the glass transmission medium using standard fiber fusion techniques and components. As such optical amplification of low power incoming optical data signals can be as high as +30 dBm and higher. In such cases pump lasers are required and available to produce required power levels to invert the glass medium in order to achieve required output levels. As such modern day pump lasers can supply optical pump levels in excess of 300 Watts of optical pump power @ 1480 nm.

By way of comparison, one optical channel passing through a +30 dBm amplifier would have +30 dBm of optical power associated with this one channel. Having four propagating channels passing through such an amplifier each output channel would have +24 dBm of optical power with the aggregate power level equal to +30 dBm.

Optical amplification technology, similar to technology used in terrestrial and submarine application is employed for FSO link operation in order to offset optical loses incurred due to atmospheric and transmission losses between various node locations. As such, FSO terminals need to be provisioned with electrical power in order to function as independent optical node terminals.

This disclosure illustrates a means of providing optical amplification functionality, (passively) without the need or requirement of supplying local electrical power to far-end or intermediate terminal locations within a FSO data link, or network topology architecture and classified as a passive-FSO (p-FSO) optical terminal.

It is an advantage of this invention that problems of the prior art, in particular insufficient power and insufficient bandwidth, are overcome. In overcoming these and other problems, the invention (among other things) provides techniques for design, realization of FSO networks and provides flexibility in positioning optical nodes within a network without the need for provisioning nodes with electrical power for operation.

This disclosure describes an approach to address issues related to providing a means to realize optical amplification, regeneration and retransmission capabilities to conventional remote FSO terminal without the need or requirement of local powering.

The approach presented in this disclosure is to use operationally p-FSO terminal designs along with a data-rate agnostic configuration at a remote terminal location. Having unpowered repeater type FSO terminals provide unique means to extend network service using unpowered remote terminal elements.

Having agnostic, data-rate insensitive FSO terminals provides the ability of the p-FSO system to adapt immediately to various changes data line rates without having the need to perform equipment changeover, thereby saving time and costs.

The p-FSO terminal segments function by transporting from a near-end terminal node, data signals as well as optical pump power required at the far-end location to facilitate optical amplification at the far-end. At the far-end, data signals present can undergo optical amplification enabled from optical pump power supplied from the powered near-end or other similar nodes.

The p-FSO optical link established may include multiple pump sources supplied from various network node locations. Such coupling has the potential to increase reliability and/or efficiency of the optical communications system, as well as to extend network reach.

In this disclosure, a dedicated optical pump source, including a dedicated USPL pump source, located at a near-end location is transmitted to an unpowered far-end location, where the received pump power is coupled into segments of erbium-doped and or erbium/ytterbium-doped fibers providing optical amplification. Such optical pumping schemes are commonly used within the optical networking industry as a means to extend the reach of data signals, especially within, but not limited to, the O-, C- and L-bands. Light frequencies transmitted by Ultra Short Pulsed Lasers (USPLs) might be converted upon reception with known frequency-conversion techniques so that the incoming light is changed to the suitable pump frequencies.

The pump signal received and supplied to a far-end node location provides necessary optical pump power for use in the optical amplification process. Received optical pump power at the far-end location provides the means to amplify low-level signals present at the far-end location for propagation back to the near-end transceiver location or other transceivers present within the network. In this manner, bi-directional links are established, without the need or requirement for electrical power at far-end or remote locations.

In a similar manner, available pump power at a far-end location can extend optical transport to directions other than direct lines of sight. Since FSO technology is directed along a single line-of-sight-path, secondary or intermediate base-stations can be remotely powered appropriately as required for links covering such non-linear paths. In such situations an intermediate base-station located at an optimum position allow for redirection to the far-end, of non-line-of-sight positions, providing the means to adapt to network geographical conditions.

To realize capabilities presented within this disclosure, a high-powered laser pump source is employed at one network location, where power and network assets are available at the near-end.

Unpowered-Repeater FSO, p-FSO transceivers operating without active electro-optic elements at remote locations within an optical network, provide a low cost, secure and efficient alternate means of extending network reach without compromising functionality.

To realize remote pump capabilities a high-power pump source transmits through a large aperture telescope with a low divergence angle toward the remote site of interest. In this manner, the near-end base-station link provides the source of pump power required at the remote location. Such pump lasers can be Continuous Wave Lasers (CW) or Pulsed Wave Laser (PW), and can operate in any of the major atmospheric and or telecommunication transmission windows.

Large aperture telescopes are commonly available with the necessary optical quality to provide a low-divergence angle of transmission to minimize optical spreading at the remote location, thereby enhancing the overall coupling efficiency between the two distant links.

The receive and transmitting telescopes may be any typical telescope types and or newer parabolic off axis telescopes. In some cased it may be beneficial to not have a secondary mirror (the small mirror in front of the big one) as in the case of the Ritchey-Chretien telescope design where the secondary mirror could produce near-field diffraction affects, which would distort the pulse. A workaround to this problem is an off-axis telescope design, which requires an off-axis parabolic mirror as the primary (large) mirror.

Such telescopes are provisioned as required to launch and receive optical signals using bulk optics or fiber coupling elements.

Although bi-directional point-to-point links are described within this disclosure, the concept and intent may be extended; multipoint, multi-hop, star type network architectures and topologies, and one-way passes.

The applications described within this disclosure identifies terrestrial based systems but shall also find value in satellite-FSO communications systems in similar topologies as well as in undersea submarine-FSO communication links.

In all cases; terrestrial-FSO, satellite-FSO, and submarine-FSO transceivers provide, the ability to provide a passive solution without the need or necessity of added weight and costs will provide a novel means for reducing costs, weight, network flexibility and operational reliability.

In one embodiment, a data source signal within the optical C-Band and a suitable pump signal can co-propagate from a base-station, near-end telescope launch site to a remote location. At the remote location, far-end, C-Band and pump signals couple into a telescope at the receive site and routed into an optical amplifier stage using either bulk optical components and or fiber-coupled components. Standard optical fiber amplifier technologies along with suitable optical elements are used within this disclosure.

Optical amplification at the far-end transceiver is performed in a manner identical to standard conventional techniques without however the requirement of electrical power to be supplied for pump operation, where the optical data link has supplied the necessary optical pump power necessary for optical amplification functions.

The manner by which remote optical pumping is performed although mentioned as standard means may be extended to other types of optical pumping schemes such as high-powered pulsed laser systems as well as Raman pumping schemes.

Having available pump power at a remote location can provide extended capabilities for providing the means for a return link to be established with the base-station east-end location, where a low level signal present at the remote station is transported as required.

The pump power laser beam and the communications data signal can be on separate lasers or the same laser. For these to be on separate signals there may be a difference in power levels and so best practices must be used to keep them separate. For example, different laser wavelengths might be used for the different signals and different detectors would be used for these wavelengths. Additionally, there may be different placement of the respective detectors relative to the transmitting optics. The transmitting optics may be separate physical systems or the two signals might be co-propagated in a single transmitting element. The separate detectors might be 'stacked' whereby one of the signals might pass transparently through one detector and be received 'behind' the other. Another configuration might allow for the two signals to be launched with two separate divergences such that the POWER signal is more broadly spread out thereby allowing a detector configuration whereby the communications detector is in the center of a much larger pump power signal rectifier that surrounds (in a much larger concentric pattern) the COMMUNICATIONS detector. Another embodiment might be that the receive telescope is designed (through surface treatments possibly including the inclusion of mirrors that focus only certain wavelengths to certain detectors or rectifiers etc.).

For the pump power and communications data signals to be one and the same, one configuration might be to data modulate a lower power signal (for example, coming directly from the oscillator) that is then modulated and then sent to the amplifier prior launching the signal. This approach will preserve and extend data modulator life. For maximum received power, a data modulation scheme can be chosen that uses all of the amplifier power available over a certain amount of time. For example, an On-off Key (OOK) data modulation scheme can be used in this design but in some cases this may lead to less efficient amplifier operation as the amplifier is receiving random series of pulses or 'no pulses' leading to uneven peak pulse power levels in the launched pulses. By contrast, a pulse position modulation (PPM) scheme might be preferable as the amplifier will always receive a pulse in a certain time slot, potentially leading to more even peak pulse powers launched and less stress on the optical detector system. Regardless, when combining both pump power and communications data into one signal, one simple receiver configuration might be to put an optical attenuator in line after the receive optics that redirects and rectifies all extra power received over a certain threshold.

Any received pump power over and above that necessary to operate the remote FSOC transceiver can be used for any other local system requiring power. This concept is straightforward but can be embodied in various configurations, specifically, bussing approaches whereby any extra power from the remote source that is not needed to operate the FSOC transceiver, can be routed to any other local (to the remote FSOC transceiver receiving the pump power signal) system that may need power to operate as well.

This disclosure contemplates a transmitting optical telescope including objective optics, to transmit various wavelengths of light within any optical band used for state-of-the-art continuous wave free space optical communications systems or expected to be forthcoming using ultrashort pulse lasers and their characteristic broadband signals which can span many octaves of light frequencies below or above the O-, C- and L-optical bands. Supporting this is the fact that ultrashort pulse lasers (USPLs) have now been demonstrated in FSOC systems by Attochron, LLC and as such represent potentially extremely broadband light sources for FSOC that extend the range of FSOC signals far beyond anything that has come before from the continuous wave (CW) laser state-of-the-art. USPL sources now exist from many established laser makers that emit anything from ultraviolet wavelengths to far into the infrared (4 microns an beyond).

Separately, newer supercontinuum (SC) USPLs provide extreme broadband light sources where a single SC USPL will emit well below the O-band and well above the L-band (spanning the O-, E-, S-, C- and L-bands in a single laser) for a USPL FSOC system for example see https://www.rp-photonics.com/supercontinuum_generation.html.

Because the USPL can emit such broadband signals—potentially spanning octaves of light frequencies—it is possible to use some of the light frequencies as pump frequencies either by 'slicing' the necessary frequencies out of the complete USPL signal and/or leverage the known techniques of frequency-conversion (i.e. second harmonic generation, third harmonic generation; frequency doubling, tripling, etc.) to 'up' or 'down' convert the received light frequencies to the required pump frequencies.

The system may include pointing and tracking systems as well as adaptive optics systems for purposes of optimizing the system's overall availability as well as the efficiency of power transfer. Unlike FSO communications-only systems, where enough power on target to ensure suitable telecommunications processes are occurring, the objective of this technology is to also get the maximum total power on target (to the receiver/rectifier/etc.) for the purposes of supplying the power the receiving system needs to operate. So anything that can be done to direct and focus/collimate the transmitted optical power to the receiver, rectifying element, etc. should be considered. Pointing and tracking (P&T) allows the system to acquire & then track the target, i.e. the launch optics (by the receiving optics) or receiver optics (by the launch optics) should either the transmitting element and/or the receiving element be in any kind of movement). Adaptive optics (AO) is a general term referring to real-time adjustments of certain optical elements in the FSO and/or FSOC platform. AO can augment the P&T capability by (for example) literally focusing the lens surface (in a refractive system) and/or perform other functions automatically including 'active divergence' (the real-time collimation of the emitting and or receiving optics), etc.

The details of one or more variations of the subject matter described herein are set forth in the accompanying drawings and the description below. Other features and advantages of the subject matter described herein will be apparent from the description and drawings, and from the claims.

The accompanying drawings, which are incorporated in and constitute a part of this specification, show certain aspects of the subject matter disclosed herein and, together with the description, help explain some of the principles associated with the disclosed implementations.

BRIEF DESCRIPTION OF THE DRAWINGS

The present invention will become more fully understood from the detailed description given herein below and the accompanying drawings which are given by way of illustration only, and thus do not limit the present invention and wherein.

DETAILED DESCRIPTION OF THE DRAWINGS

The details of one or more variations of the subject matter described herein are set forth in the accompanying drawings and the description below. Other features and advantages of the subject matter described herein will be apparent from the description and drawings, and from the claims.

The accompanying drawings, which are incorporated in and constitute a part of this specification, show certain aspects of the subject matter disclosed herein and, together with the description, help explain some of the principles associated with the disclosed implementations.

Figure 1:
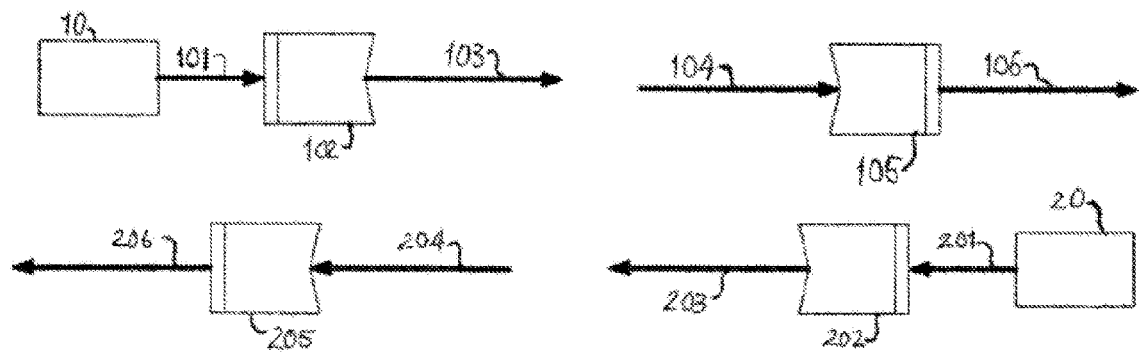
FIG. 1 is a block diagram of fully functional FSO data link with network connectivity, according to the invention; where the FSO link as shown consists of two individual send (transmit) and receive optical elements.

FIG. 1 describes essential elements incorporated within a FSO data-link, where element 10 represents a network data signal operating at a nominal data rate at a wavelength of 1550 nm. Although identified as a 1550 nm source signal element 10 can represent any typical optical source including an USPL source within the O-, C- and L-bands or other selected bands, and can be directly coupled to transmitting element 102 through the use of fiber optic cabling or free-space coupled as identified by element 101. Element 102 represents the launch transceiver's optical telescope for signal transport over free-space where the amount of optical divergence can be controlled through proper adjustment of optical elements within element 102. Element 103 represented the launched or transported optical signal from element 102. Element 104 represents the optical signal presented to the far-end receive transceiver, after propagating through the optical data-link span, where geometrical spreading losses as well as known atmospheric effects attenuate the effective optical power level at the remote transceiver's telescope receive aperture identified as element 105. Elements 103 and 106 are effective optical power levels after signals have been attenuated through optical elements 102 and 105 respectively. Telescope insertion losses can be minimized through proper design and aperture arrangements. Elements 20, the far-end laser launch source, 202 far-end transceiver's telescope launch optics along with element near-end transceiver's telescope 205 constitute a second optical transmit path, 203 and 204, from the far-end to the near-end and provide bi-directional link functionality. Element 301 is the effective optical power level after signal 104 has been attenuated through transceiver's telescope element 205. At each location, near- and far-end electrical power is required in some form for link functionality, to provide the necessary optical power level to overcome atmospheric and geometrical, as well as optical insertion losses for link operation. In many cases, link operation is dependent upon the amount of optical power available to provide "link-closure" or the ability of the receive location to detect incoming data-signals. In each case, link margin provides an indication of the amount of power available to overcome expected link losses.

Figure 2:
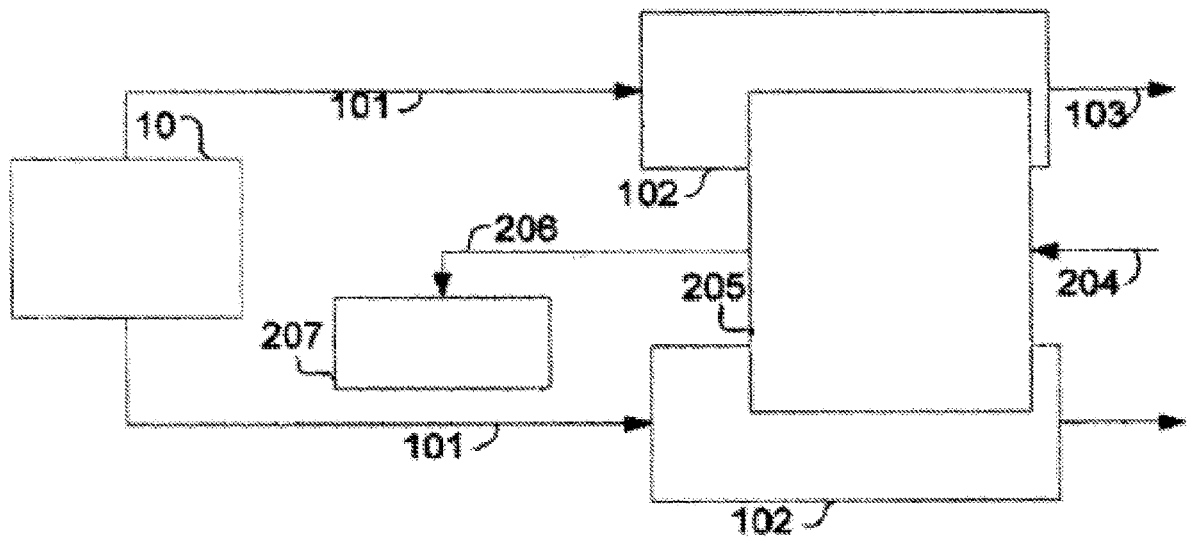
FIG. 2 is a functional block diagram of a generic FSO Transceiver, providing bi-directional capabilities, according to the invention.

FIG. 2 identifies the main features for an electrically powered FSO transceiver, wherein elements 102 represent a plurality of possible transmitting optical telescope elements used for launch data signals from source 10. Within the figure elements, 101 can represent optical fiber interconnections or bulk free-space optical coupling to telescope transmitting elements 102. Although source 10 is identified as a single source this element can be replaced by a 1×N (where N is an integer greater than 1) optical splitter, wherein an incoming optical signal is divided as required to a corresponding number of transmitting elements as described by element 102. In another embodiment element 10 can be replaced by multiple optical sources and coupled to various optical elements as required and depicted by element 102, and launched into free-space as depicted by element 103. Element 204 represents a free-space optical signal propagating inbound into receive element 205. Element 205 may consist of any appropriate optical telescope of either the reflective or refractive type, and provisioned to couple directly into an optical receiver directly or into other optical elements providing necessary functionality, such as an optical circulator, optical de-multiplexer or the like, using either bulk optics or fiber coupled as required can be incorporated, where these functional capabilities are identified by element 207.

Figure 3:
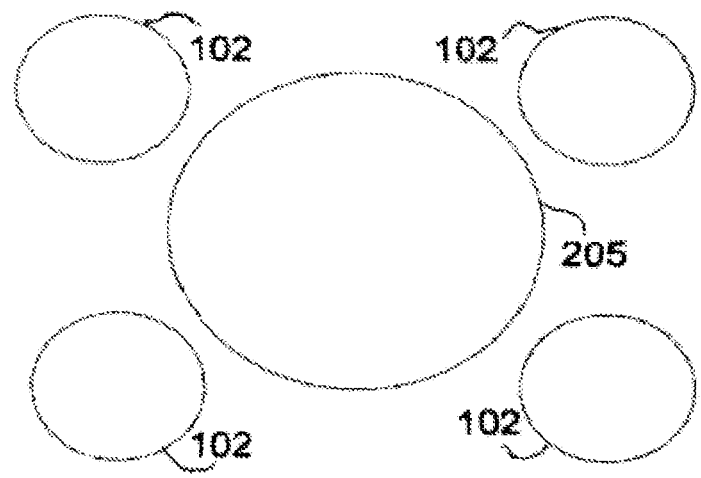
FIG. 3 is a functional front-end view of a generic FSO Transceiver, illustrating bi-directional capabilities, according to the invention.

FIG. 3 provides a front-end illustration of one possible configuration of a FSO optical transceiver; where for illustrative purposes four transmitting elements identified as 102 is shown. For each aperture, single-mode or multi-mode optical fiber can be utilized for interconnection to each element or if required bulk, free-space optical assemblies. Element 205 represents the receive aperture for this particular transceiver element.

Figure 4:
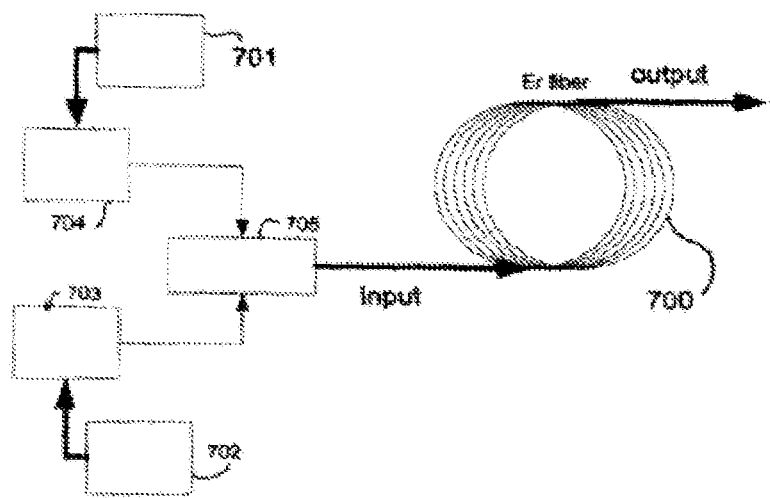
FIG. 4 is a functional block diagram of a generic optical amplifier module along with optical components required to perform optical amplification capabilities, according to the invention.

FIG. 4 presents essential basic elements used in standard optical amplifier designs, where actively doped optical fiber represented by element 700 is optically pumped by an optical pump source identified by element 704 that is activated by electrical power source 701 in conjunction with a low power level data-signal identified by element 703 that is activated by electrical power source 702. The optical outputs from Elements 703 and 704 are coupled into element 700 through the use of a suitable optical coupler identified by element 705. In all cases, elements 703, 704 and 705 may incorporate either single or multi-mode optical fiber designs. Element 706 provides the optical data signal as amplified through element 700.

In another embodiment, the optical amplifier design illustrated in FIG. 4 may utilize a multi-mode optical amplifier design previously cited in U.S. Pat. No. 6,348,684 titled RECEIVING SYSTEM FOR FREE SPACE OPTICAL COMMUNICATIONS BY g, Nykolak et al. granted Feb. 19, 2002, where optical inputs into the amplifier stage are based upon a multi-mode optical fiber technology.

Figure 5:
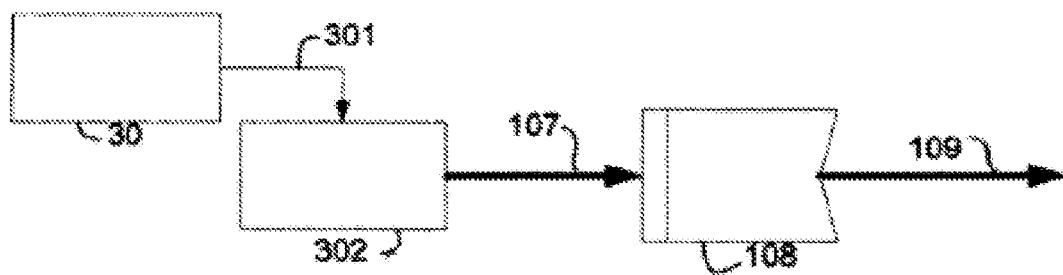
FIG. 5 is a functional block diagram of a Near-end FSO terminal for launching optical pump power launch to a far-end, unpowered FSO terminal at a remote location to facilitate optical amplification at a remote unpowered far-end location, according to the invention.

FIG. 5 illustrates a single function design for the near-end (transceiver segment), where only a pump signal is illustrated and transmitted to far-end transceiver Elements 30, 302, and 109 represent the pump source, WDM coupler, and propagating pump signal from the launch telescope 108 element respectively. Element 108 is identified as a suitable optical transmit telescope aperture.

Figure 6:
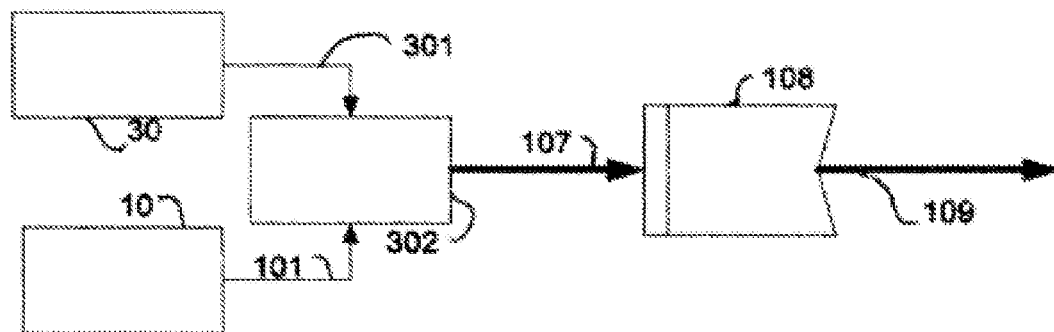
FIG. 6 is a functional block diagram of a transmit FSO transceiver for launching both optical pump power for remote usage along with in-band data signals, to a far-end, unpowered remote location to facilitate optical amplification at a remote unpowered far-end location, according to the invention.

FIG. 6 illustrates the addition of a data channel for free-space propagation to a far-end transceiver in conjunction with a dedicated pump source for use at the far-end only. The optical data channel, identified by element 10 in FIG. 6 may be a conditioned optically amplified signal previously amplified by separate means at the near-end, for efficient propagation to the far-end. As such, ancillary optical amplification functions for element 10 are provided separately. Identified by element 109 of FIG. 6 both the signal channel, 101 and well as the pump source identified by element 301 may co-propagate along the same optical paths 107 and 109 before entering and after leaving telescope 108 or may incorporate separate optical launch optics and propagate along adjacent paths (not shown).

Figure 7:
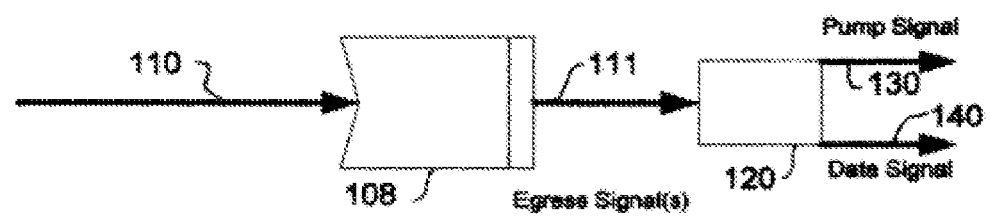
FIG. 7 is a functional diagram of a far-end unpowered FSO transceiver describing reception and separation of received pump and data signals, according to the invention.

FIG. 7 illustrates the basic design features accompanied as realized at a far-end location, where an incoming signal 110, containing both pump source and data channel, identified as an egress signal 110 to a receive element identified as telescope 108. Signal separation is accomplished by element 120, an optical de-multiplexer separating received optical element 111 into pump and data channels as identified by elements 130 and 140 respectively. In all cases described multi-mode optical fiber interconnections are used to providing efficient coupling. As a result of this operation a resident and available pump source has been provided to the far-end location for required system use. The data channel 140 can be provisioned for further transport to other network transceivers or to another FSO type of telescope element for re-transmission to another transceiver. location.

Figure 8:
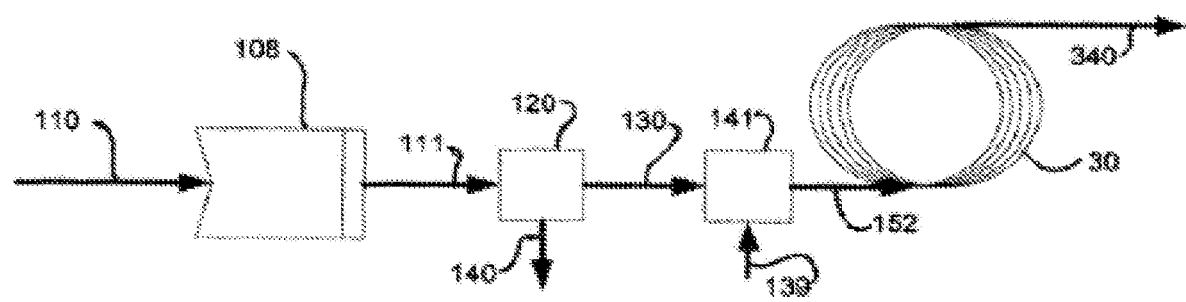
FIG. 8 is a functional diagram of a far-end unpowered FSO terminal illustrating amplification of local optical data signal and delivered optical pump power as provided from the transmit end location, according to this invention.

FIG. 8 presents details related to routing of laser pump and data channels at the far-end transceiver location along with amplification of additional network capacity at a remote unpowered FSO transceiver. In FIG. 8 element 110 represents an incoming optical signal containing both remote amplifier pump power identified by element 130 as well as transported data capacity identified by element 140. Telescope Element 108 captures incoming element 110 and couples the received optical stream into an optical de-multiplexer identified by element 120. Element 120 separates pump power identified by element 130 from the data stream identified by element 140. Element 140 is routed to available network hardware for interconnection into other transceiver network elements. Element 130 couples into element 141, that combines received pump element 130 with data capacity located at the far end identified by element 139. The coupled output from element 141 is coupled by way of optical fiber element 152 to an optical amplifier element as identified by element 30 shown in FIG. 8. In so doing local data traffic, as identified by element 139, is remotely pumped and provisioned for further transport to additional network elements in fiber or FSO transport networks.

What is claimed is:

1. A free-space optical (FSO) communications network including an electrically powered near-end transceiver with one or more transmit apertures that can transmit, via FSO laser beam(s), both data signals and sufficient optical pump power to activate one or more remote (far-end) transceivers that do not have source(s) of electrical power such that the near-end transceiver includes one or more transmitting telescope(s) that are used to transmit sufficient optical pump power levels along with co-propagating data signals to remote telescope(s) associated with one or more of the said unpowered remote transceiver(s) that are designed to couple the received optical pump power to optical amplifier(s) within the remote transceiver(s) to amplify incoming data signals so that the remote transceiver has the ability to provide the necessary level of optical amplification for NRZ, RZ or other data transport modulation formats without the need for local electrical power.

* * * * *